(12) United States Patent
Egoshi

(10) Patent No.: US 6,418,116 B1
(45) Date of Patent: Jul. 9, 2002

(54) TRANSMISSION SYSTEM HAVING AN UNINTERRUPTED SWITCHOVER FUNCTION FOR A PLURALITY OF LINES

(75) Inventor: Hiroya Egoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/543,301

(22) Filed: Apr. 5, 2000

(30) Foreign Application Priority Data

Jul. 8, 1999 (JP) .......................................... 11-194375

(51) Int. Cl.$^7$ .............................................. G01R 31/08
(52) U.S. Cl. ..................... 370/217; 370/244; 370/248; 714/25; 714/48; 340/2.1; 340/2.8; 340/3.43
(58) Field of Search ................................ 370/217, 216, 370/221, 222, 223, 224, 225, 496, 508, 517, 219, 220, 227, 228, 248, 242, 251, 252, 415, 420, 244, 516, 519, 520, 532; 714/43, 47, 48, 25, 41, 703; 340/825.01, 2.1, 2.24, 2.8, 3.43

(56) References Cited

U.S. PATENT DOCUMENTS 4,888,792 A * 12/1989 Yagi et al. .................. 375/264
5,481,547 A * 1/1996 Sasaki et al. ............... 370/505

FOREIGN PATENT DOCUMENTS

JP        5-136765      6/1993
JP        07321711      12/1995

* cited by examiner

*Primary Examiner*—Seema S. Rao
*Assistant Examiner*—Phirin Sam
(74) *Attorney, Agent, or Firm*—Rosenman & Colin LLP

(57) ABSTRACT

A transmission system having an uninterrupted switchover function for a plurality of lines is disclosed. The aims are to prevent unnecessary switchover and to provide high quality transmission system even using low quality lines with a minimal hardware configuration of memories and a control circuit. On the transmitting side, a pulse for phase synchronization is inserted at the top of each signal frame. Such frame signals are branched to transmit on a plurality of lines. On the receiving side, an alarm or error in signals from lines is detected on a frame basis. Then, a line switchover is carried out at the unit of a frame after frame phases are synchronized. To synchronize the frame phases, elastic memories for producing variable amount of delay are used in addition to fixed-amount delay circuits. This enables to insert a sufficient amount of delay to generate required timings for detecting errors, controlling and performing a switchover etc. Namely, time margin needed from the detection of an alarm or error to the execution of switchover is produced. Consequently, before the signal having an alarm or error is output, the line can be switched over without producing momentary interruption against signal traffic.

8 Claims, 6 Drawing Sheets

TRANSMISSION SYSTEM HAVING AN UNINTERRUPTED SWITCHOVER FUNCTION FOR A PLURALITY OF LINES

FIELD OF THE INVENTION

The present invention relates to a transmission system having a switchover function for a plurality of transmission lines without producing momentary interruption of traffic.

BACKGROUND OF THE INVENTION

In conventional transmission systems, measures have been taken for switching transmission lines without producing momentary traffic interruption at the time of altering line configuration. In recent years, such uninterrupted switchover of lines has also been required even in the event of failure in equipment or a line for obtaining increased transmission quality especially in backbone transmission systems.

Generally, requirements for transmission lines can be classified into two: obtaining high quality and high reliability to carry traffics of emergency information, banking systems etc.; and obtaining large capacity with low cost for use in the Internet etc. where transmission quality is not regarded of great importance.

It is therefore required to cope with such variety of requirements for lines with the provision of better flexibility.

In FIG. 5, there is shown a block diagram to illustrate a conventional method for controlling an uninterrupted line switchover. In the example shown in FIG. 5, station (A) 10 and station (B) 20 are directly connected through a line 1. Further, these stations are respectively connected through a line 2 to station (C) 3 which acts as transit equipment.

In the example shown in FIG. 5, line 1 is operated as an active line and line 2 is operated as a standby line. Both line 1 and line 2 transmit the identical data. Here, for station (A) 10 and station (B) 20 in FIG. 5, only related parts to the present invention i.e. a signal transmission portion in station (A) 10 and a signal reception portion in station (B) 20 are shown.

In FIG. 6, a time chart is shown illustrating the line switchover operation in the configuration shown in FIG. 5. Signal timing corresponding to respective parts of a1, b1, c1, d1, e1 and f1 in FIG. 5 is shown.

In FIG. 5, a frame pulse insertion circuit (FPINS) 11 in station (A) 10 is a circuit for inserting a frame pulse at the top of a frame to identify a switchover position. An output of frame pulse insertion circuit 11 is forwarded to a distribution circuit (DIS) 12.

The output of frame pulse insertion circuit 11 is branched into two by distribution circuit 12, to be forwarded respectively to active line 1 and standby line 2. On the other hand, in a signal reception portion of station (B) 20, there are provided a line selection circuit (SEL) 21 for selecting a line; alarm detection circuits (ALMDET) 22 and 23 for detecting line alarm conditions or received signal errors; and frame pulse detection circuits (FPDET) 24 and 25 for detecting a frame pulse to identify a switchover position in received signals.

Furthermore, a control circuit 26 controls an elastic memory 27 according to inputs from alarm detection circuits 22 and 23 and from frame pulse detection circuits 24 and 25. Elastic memory 27 functions as a variable delay circuit which can variably adjust the amount of delay. On the other hand, a fixed-amount delay circuit 28 produces a fixed amount of delay against signals received through active line 1.

Thus, control circuit 26 adjusts the amount of delay in elastic memory 27 so that the timing between a signal received from active line 1 and an identical signal received from standby line 2 may coincide. Thereafter each of these signals is input into line selection circuit (SEL) 21.

Referring to FIG. 6, it is assumed that signal b1 is transmitted on active line 1 and also signal a1 is transmitted on standby line to station (C) 3. There is a delay against signal a1 produced in signal c1 to be input into station (B) 20 via standby line 2. (Refer to signal c1 in FIG. 6.)

Control circuit 26 adjusts the amount of delay in elastic memory 27 using outputs of frame pulse detection circuits 24 and 25, to adjust phases of the two signals (d1, e1 in FIG. 6).

Now, when a failure occurs in frame timings 1 and 2 in signal b1 of active line 1, the failure is detected by alarm detection circuit 23. Signal b1 receiving the failure is delayed in fixed-amount delay circuit 28 and is forwarded to line selection circuit 21 at the timing of signal e1.

Control circuit 26 then adjusts the amount of delay in elastic memory 27 to synchronize the timing of signal e1 with the timing of signal c1 input from the standby line, to forward to line selection circuit 21 as signal d1.

Line selection circuit 21 selects signal d1 received through standby line 2 to substitute for signal e1 on active line 1 under the control of control circuit 26, to output signal f1. Thus effect of the failure to signal transmission is eliminated.

In the above conventional method, signal transmission is interrupted when alarm or error conditions simultaneously occur on both active line 1 and standby line 2. To avoid this problem and keep signal traffic from interruption even in such cases, a method that a standby line is selected from a plurality of lines is applicable, using a method similar to the above.

However, in order to realize this method in a conventional way, delay circuits such as elastic memories must be implemented independently line by line. This requires increased amount of memories as well as complicated control circuits, making equipment large in scale.

SUMMARY OF THE INVENTION

It is an object of the invention to provide a transmission system with a method for controlling uninterruptible line switchover for a plurality of lines to obtain high transmission quality even when using low quality lines and avoid unnecessary occurrence of line switchover, with minimal hardware configuration of memories, control circuit, etc.

It is another object of the invention to provide a transmission system with a method for controlling uninterruptible switchover for a plurality of lines having redundant configuration to keep or restore signal transmission from interruption and errors.

The following means is provided to solve aforementioned problems: A plurality of standby lines are provided for selecting to switch over, while conventionally there have been provided totally two lines each constituting an active line and a standby line. Also, a single elastic memory is provided for a plurality of lines to be selected in advance by a selection circuit, while a plurality of elastic memories have conventionally been provided corresponding to respective lines.

General method is described hereinafter prior to the explanation on the present invention. Signals are transmitted using a partition called 'frame'. The normality of received signals is verified on frame basis i.e. frame by frame on the receiving side, and a switchover is carried out when necessary at the unit of frame after frame phases are synchronized for each line. Based on this method, if an error occurs on a line, signal transmission can be realized without an error at the output by replacing a frame having the error with a corresponding frame received on another line.

On the transmitting side, a top of a frame for phase synchronization is inserted and is branched to a plurality of lines to transmit. On the receiving side, an existence of alarm or error condition is examined at every frame of respective lines. After the phases are synchronized, line switchover is carried out at the unit of a frame when necessary.

The first feature of a transmission system according to the present invention having a control function of uninterruptible switchover of a plurality of lines is described below:

On the transmitting side there is provided a transmission portion which includes: a frame pulse insertion circuit for inserting a pulse at the top of each frame of a signal for phase synchronization; and a distribution circuit for branching the signal having the frame pulse to a plurality of lines.

On the receiving side, there are provided alarm and error detection circuits corresponding to each plurality of lines; first and second line selection circuits which respectively receive signals from the plurality of lines and select a signal therefrom to output; first and second delay circuits which respectively receive outputs from the first and second line selection circuits; first and second fixed-amount delay circuits which respectively receive signals from said first and second delay circuits to produce the same amount of delay; a third line selection circuit which receives signals from the first and second fixed-amount delay circuits and selects a normally operational line to output a signal thereof; and a control circuit for adjusting the amount of delay produced by the first and second delay circuits so that signal phases output from the first and second fixed-amount delay circuit mutually coincide to forward to the third line selection circuit. The control circuit also aims for controlling the third line selection circuit to select a signal from the normally operational line to output when an alarm or error condition is detected on an active line.

Preferably, in the first feature described above, the first and second line selection circuits select a line having the best quality among the plurality of input lines to output a signal received from the selected line.

Preferably, in the first feature, the first and second line selection circuits successively search for selecting a line in neither alarm nor error condition among the plurality of input lines to output a signal received from the selected line.

Preferably, in the first feature, the first and second line selection circuits store a history record of alarm or error conditions on the plurality of input lines, to select a line having the least number of alarm or error records to output a signal received from each of the selected line.

The second feature of the transmission system according to the present invention having a control function of uninterruptible switchover of a plurality of lines is shown below:

On the transmitting side, there is provided a transmission portion which includes a frame pulse insertion circuit for inserting a pulse at the top of each frame of a signal for phase synchronization; and a distribution circuit for branching the signal having the inserted frame pulse to a plurality of lines. The receiving side includes; alarm and error detection circuits corresponding to each plurality of lines; first, second and third line selection circuits which respectively receive signals from the plurality of lines and select a signal therefrom to output; first, second and third elastic memories which respectively receive outputs of the first, second and third line selection circuits; first, second and third fixed-amount delay circuits which respectively receive outputs of the first, second and third elastic memories to produce the identical amount of delay; a fourth line selection circuit which receives outputs of the first, second and third fixed-amount delay circuits and selects any a normally operational line to output a signal thereof; and a control circuit for adjusting the amount of delay produced by the first, second and third elastic memories so that output signal phases from the first, second and third fixed-amount delay circuits mutually coincide. The control circuit also aims for controlling the fourth line selection circuit to select a signal from the normally operational line to output in the event of an alarm or error detected on an active line.

Preferably, in the second feature of the present invention, the first, second and third line selection circuits select a line having the best or better quality among a plurality of input lines to output a signal received from each of said selected lines.

Preferably, in the second feature, the first, second and third line selection circuits successively search for selecting lines in neither alarm nor error condition among the plurality of input lines to output a signal received from each of the selected lines.

Preferably in the second feature, each of the first, second and third line selection circuits stores a history record of alarms or errors related to the plurality of input lines to select lines having the least or less number of alarms or errors to output a signal received from each of said selected line.

Other features and aspects of the present invention will become more apparent by the embodiments illustrated in accordance with the following charts and drawings.

PREFERRED EMBODIMENTS OF THE INVENTION

The preferred embodiments of the present invention are described hereinafter referring to the accompanied charts and drawings wherein same numerals or symbols are used to refer to like parts.

Figure 1:
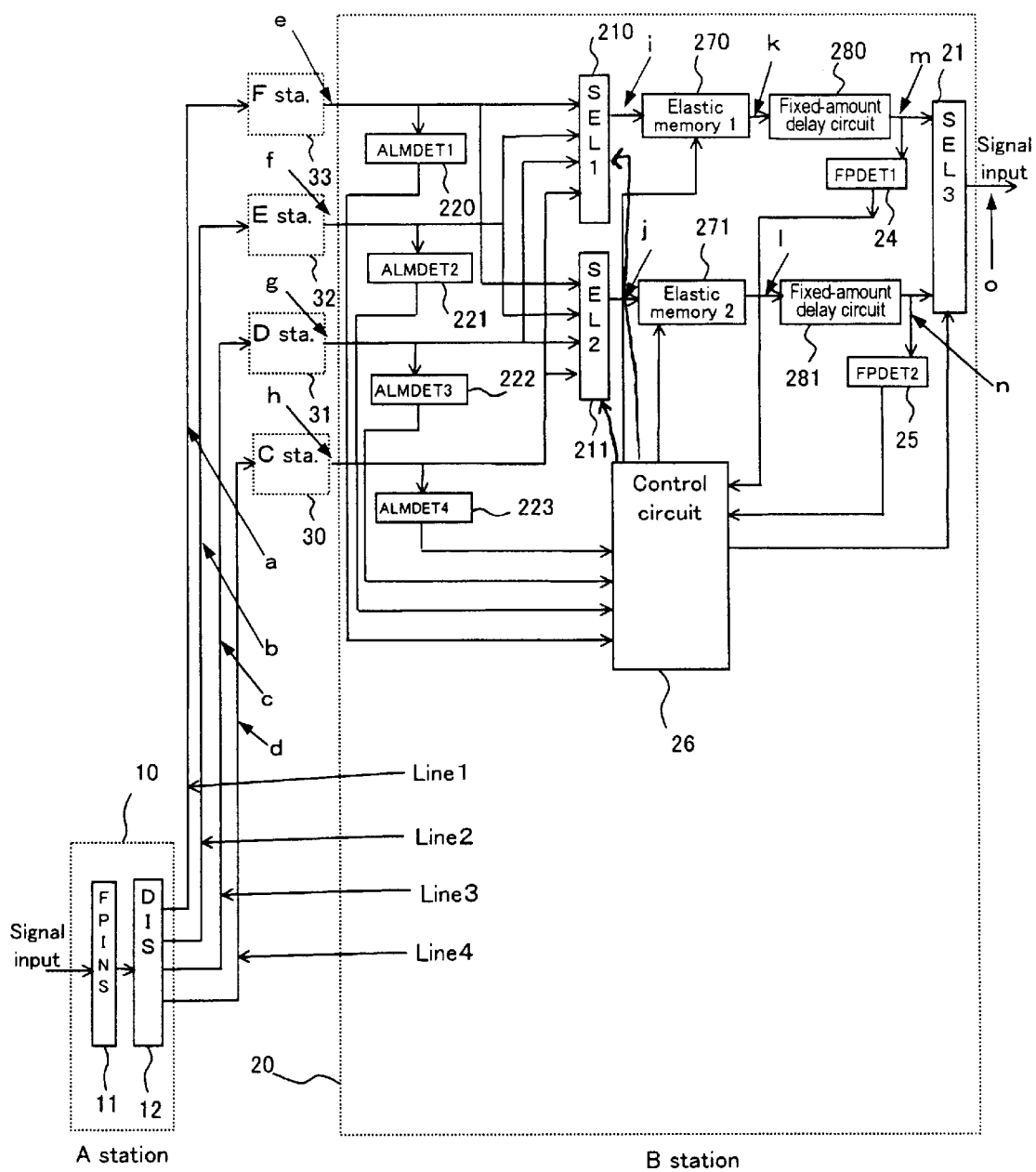
FIG. 1 is a block diagram illustrating the first embodiment of the present invention.
Figure 2:
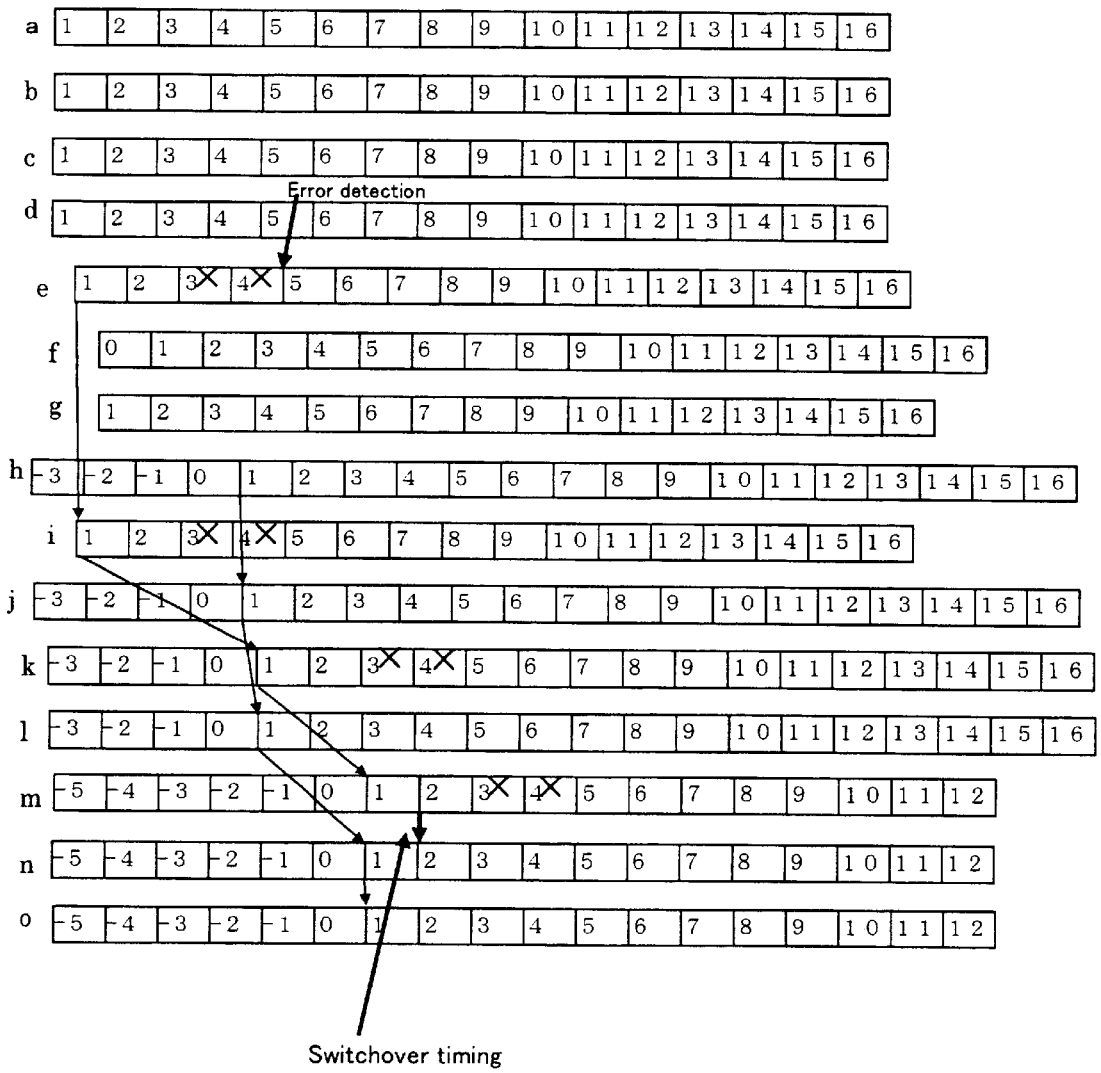
FIG. 2 is a time chart of signals corresponding to respective parts 'a' to 'o' in the configuration of FIG. 1.

FIG. 1 shows a block diagram of the first embodiment of the present invention. FIG. 2 shows a time chart of respective signals corresponding to the respective parts 'a' to 'o' in the configuration of FIG. 1.

Figure 5:
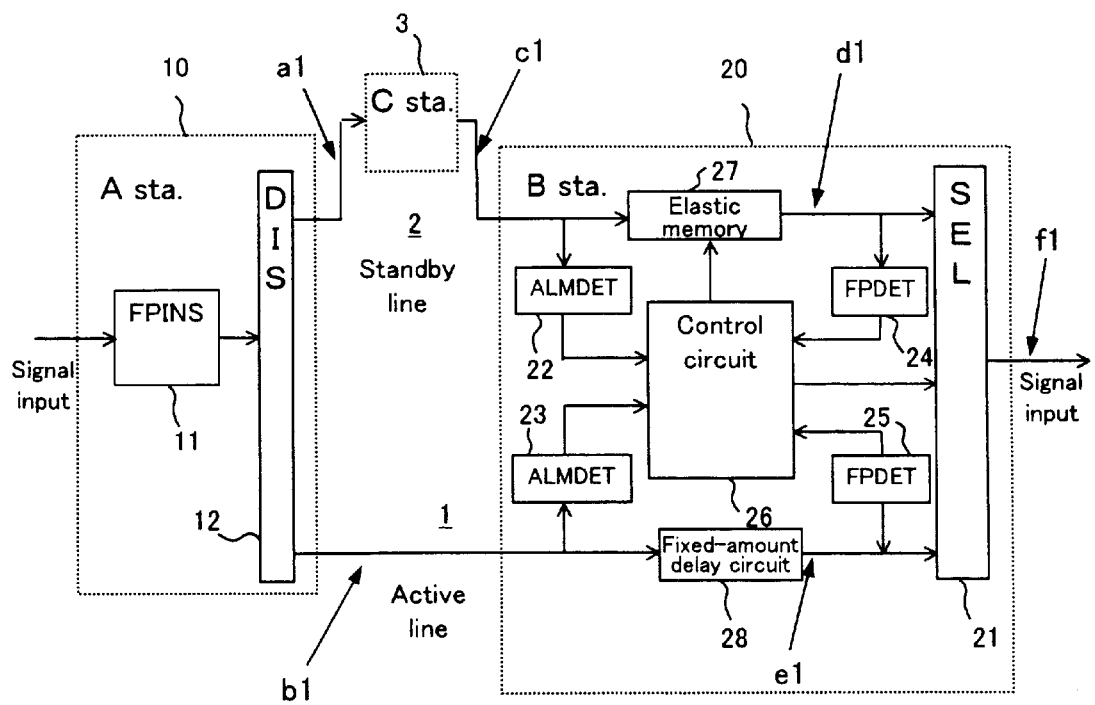
FIG. 5 is a block diagram illustrating a conventional control method of an uninterrupted line switchover.
Figure 6:
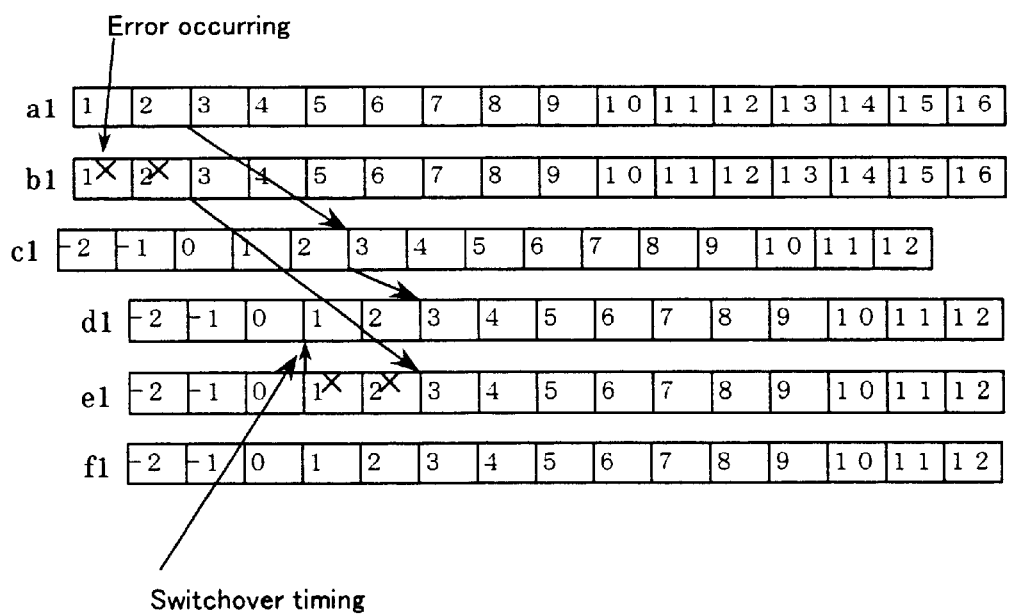
FIG. 6 is a time chart illustrating the line switchover operation in the configuration of FIG. 5.

Compared to a conventional example shown in FIG. 5, the configuration example shown in FIG. 1 includes station (A) 10 and station (B) 20 connected by totally four lines i.e. line 1 to line 4. As transit stations, station (C) 30, station (D) 31, station (E) 32 and station (F) 33 are connected between stations (A) 10 and station (B) 20.

In station (A) 10 on the transmitting side, there are provided a frame pulse insertion circuit 11 to insert a frame pulse signal at the top of a frame for the phase synchronization; and a distribution circuit 12 to branch a signal having the frame pulse inserted at the top of the frame to forward to four lines. Branched signals a4, b4, c4 and d4 are transmitted to respective four lines.

On the other hand, in station (B) 20 on the receiving side, there is provided a reception portion which includes alarm detection circuits 220 to 223 respectively corresponding to line 1 to 4. Each of line selection circuits 210 and 211 receives signals corresponding to four lines 1 to 4. Outputs of a first and a second line selection circuits 210 and 211 are respectively input to a first and a second elastic memories 270 and 271. Outputs of the first and second elastic memories 270 and 271 are then input to fixed-amount delay circuits 280 and 281.

Control circuit 26 controls the amount of delay in elastic memories 270 and 271, according to outputs of alarm detection circuits 220 to 223 and frame pulse detection circuits 24 and 25.

Referring to a time chart in FIG. 2, signals 'a' to 'd' corresponding to a to d in FIG. 2, transmitted by station (A) 10 through lines 1 to 4 are input to station (B) 20 via transit stations 30 to 33 with respective different amount of delay (signals e, f, g and h in FIG. 2).

In the example of FIG. 2, it is assumed that line selection circuit 21 selects signal 'i' received from active signal line 'a' through transit station (F) 33 to output signal 'o' as an output signal (signal i in FIG. 2). A line having the best quality is selected as the standby line by line selection circuit 211 and signal 'j' of the selected line is input to elastic memory 271 (signal j in FIG. 2).

Control circuit 26 controls the amount of delay in elastic memories 270 and 271 according to the detection result produced by frame phase detection circuits 24 and 25, to adjust input phases of fixed-amount delay circuits (hereinafter referred to as 'fixed delay circuits') 280 and 281 (signals k and l in FIG. 2).

As the amount of delay respectively produced in fixed delay circuits 280 and 281 is fixed and mutually the same, signal phases input into line selection circuit 21 from an active line and a standby line are the same (signals m and n in FIG. 2).

Now, it is assumed that an alarm or error is detected in an active line by alarm detection circuit 220. Then, control circuit 26 controls line selection circuit 21 to switch the active line from a line via station (F) 33 newly to a line having the best quality, for example a line via station (C) 30, at the timing of frame #2 to output signal 'o'. Thus a normal active line is established.

Here, in the embodiment shown in FIG. 1, each of fixed delay circuits 280 and 281 is inserted between elastic memories 270, 271 and line selection circuit (SEL3) 21. This enables to produce fixed delay time required for error detection, control and line switchover, etc., i.e. to produce time margin from the detection of an alarm or error to a line switchover. Thus, without producing momentary interruption, line switchover is carried out before a signal having been affected by an alarm or error appears on an output.

In the above description on the configuration shown in FIG. 1, there has been explained a line selection method that a line having the best quality is selected in line selection circuits 210 and 211.

In the present invention, however, the method is not restricted to the above: It may also be possible to search lines successively to select a line out of a plurality of lines. That is, in respective line selection circuits 210 and 211, the first line is selected out of n circuits (n=4 in the example of FIG. 1) when neither alarm nor error is detected in the first line. If, on the other hand, an alarm or error condition is detected on this first line, then the second line is selected when neither alarm nor error is detected in this second line. In such a way, a line having neither alarm nor error is successively searched to select out of a plurality of lines.

Otherwise, it may also be possible to apply the following method: A memory is provided corresponding to each line in line selection circuits 210 and 211 to store a history record in regard to occurrences of alarm or error condition. Respective line selection circuits 210 and 211 select a line having the least number of alarms or errors stored in the history record. When this selected line having the least number of alarms or errors can not actually be selected because of an existence of an alarm or error, a line having the second least number of alarms or errors is selected.

Figure 3:
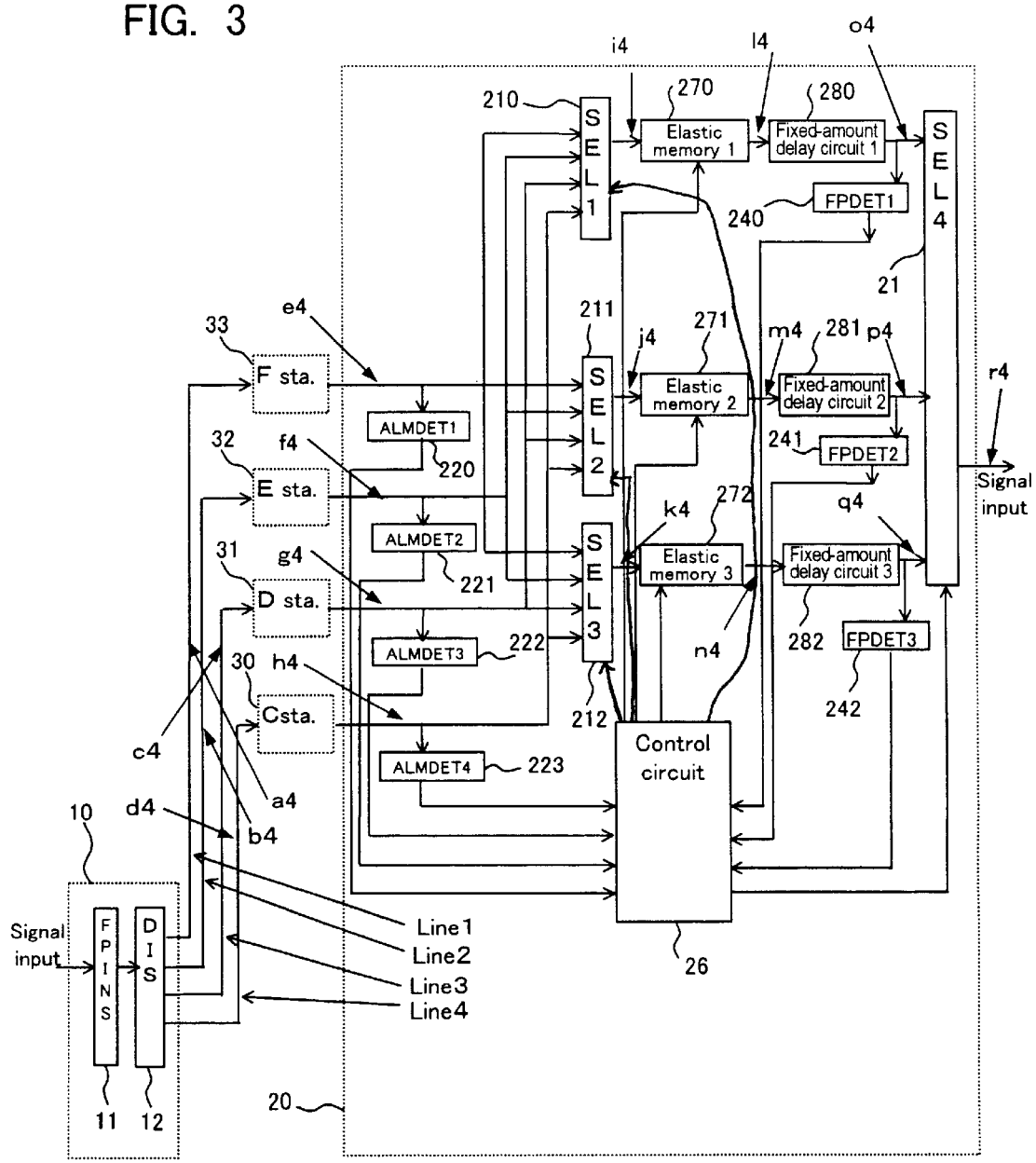
FIG. 3 is a block diagram illustrating the second invention of the present invention.
Figure 4:
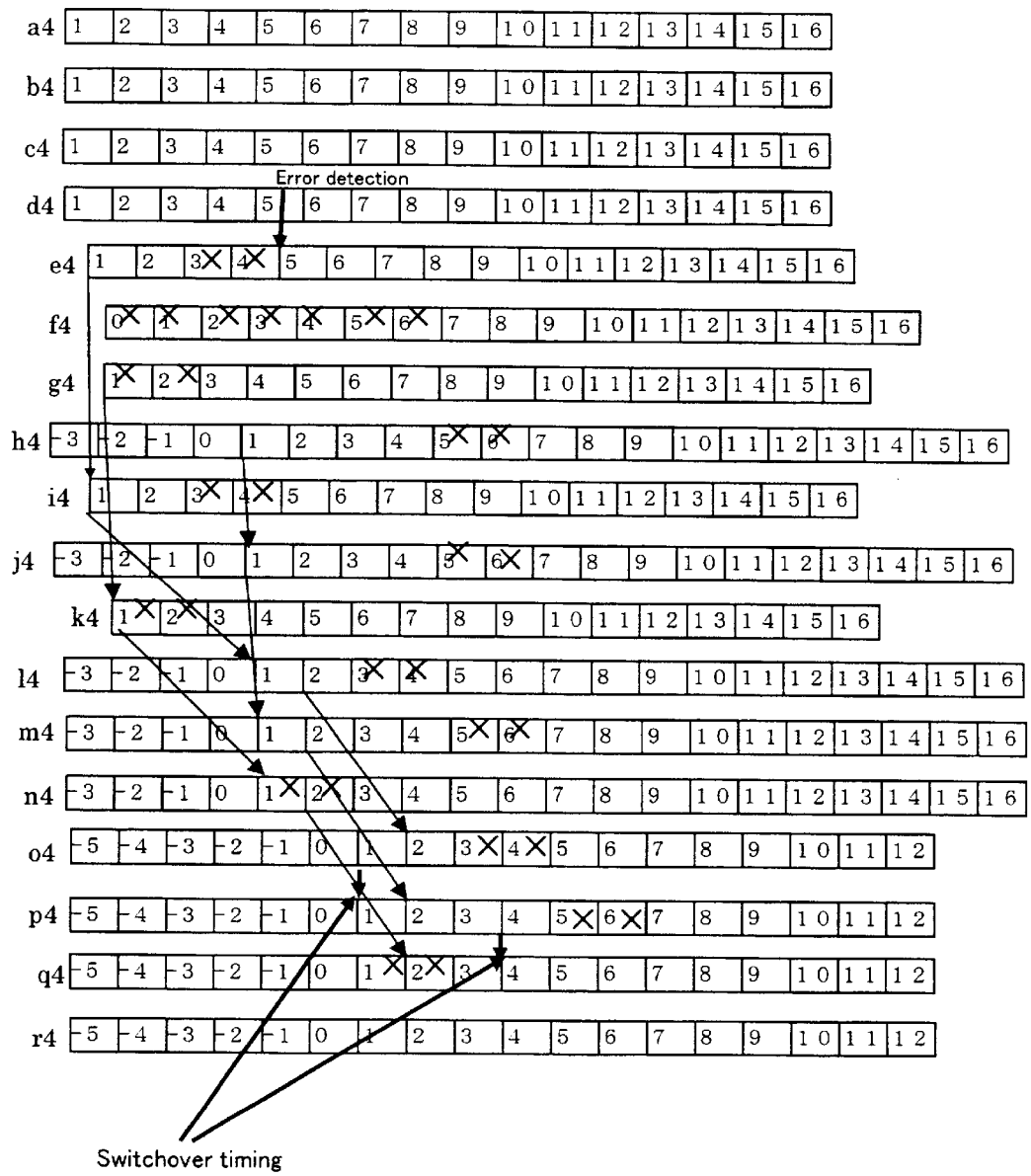
FIG. 4 is a time chart of signals corresponding to respective parts 'a' to 'r' in the configuration of FIG. 3.

In FIG. 3, there is shown a block diagram of the second embodiment of the present invention. In FIG. 4, a time chart is shown corresponding to signals of respective parts a4 to r4 in a configuration of FIG. 3.

Compared to a conventional example shown in FIG. 5, the configuration in FIG. 3 is similar to the configuration in FIG. 1: An example of station (A) 10 and station (B) 20 is shown, between which four lines i.e. line 1 to line 4 are connected. As transit stations, station (C) 30, (D) 31, (E) 32, and station (F) 33 are connected between station (A) and (B).

In station (A) 10 on the transmitting side, there are provided a frame pulse insertion circuit 11 to insert a frame pulse at the top of a frame for the phase synchronization; and a distribution circuit 12 to branch to four lines the frame pulse signal inserted at the top of the frame. Branched signals a4, b4, c4 and d4 are forwarded to respective four lines.

On the other hand, in station (B) 20 on the receiving side, the reception portion thereof includes alarm detection circuits 220 to 223 corresponding to line 1 to 4, respectively. Each of three line selection circuits 210, 211 and 212 receives input signals corresponding to four lines 1 to 4.

Outputs of three line selection circuits 210, 211 and 212 are respectively input to the first, second and third elastic memories 270, 271 and 272. Outputs of the first, second and third elastic memories 270, 271 and 272 are then input to fixed delay circuits 280, 281 and 282.

Control circuit 26 controls alarm detection circuits 220 to 223 and also controls the amount of delay in elastic memories 270, 271 and 272 according to outputs of frame pulse detection circuits 240, 241 and 242.

Referring to a time chart in FIG. 4, signals a4 to d4 (a4 to d4 in FIG. 4) transmitted by station (A) 10 through line 1 to 4 are input to station (B) 20 via transit stations 30 to 33 with different amount of delay (signals e4 to h4 in FIG. 4).

In the example of FIG. 4, it is assumed that signal line 1 through transit station (F) 33 acts as an active line and line selection circuit 21 selects signal i4 to forward as output signal r4 (signal r4 in FIG. 4). As for standby lines, alarm and error detection circuits 220 to 223 detect an alarm or error condition of each line.

Using the results of the above alarm and error detection, two (2) of the best quality lines are selected, signals j4 and k4 of the selected lines are input to elastic memories 271 and 272 by line selection circuits 211 and 212 (signals j4 and k4 in FIG. 4).

Control circuit 26 controls the amount of delay in elastic memories 270, 271 and 272 according to the detection result produced by frame phase detection circuits 240, 241 and 242, to adjust input phases of fixed delay circuits 280, 281 and 282 (signals 14, m4 and n4 in FIG. 4).

As each amount of delay produced in fixed delay circuits 280, 281 and 282 is fixed having the same amount, phases between inputs of line selection circuit 21 from the active line and from two standby lines are identical (signals o4, p4 and q4 in FIG. 4).

Now, it is assumed that an alarm or error is detected in the active line by alarm detection circuit 220. Then, control circuit 26 controls line selection circuit 21 to switch the active line from a line via station (F) 33 to a line having the best quality, for example a line via station (C) 30, at the unit of a frame to output signal r4. Thus a normal line is established.

Here, in the embodiment shown in FIG. 3, fixed delay circuits 280, 281 and 282 are inserted between line selection circuit 21 and elastic memories 270, 271 and 272, respectively. This enables to insert delay for producing time margin from the detection of an error to a line switchover.

Namely, by inserting a fixed amount of delay required for error detection, control and line switchover, the switchover can be completed before the signal affected by the event of an alarm or error is output. Thus no error is produced in output signals.

Now, the embodiment on the receiving side shown in FIG. 3 is compared to that shown in FIG. 1: In the embodiment in FIG. 1, signals are selected by line selection circuits 210 and 211 and are forwarded to elastic memories 270 and 271 and also to fixed delay circuits 280 and 281. Then the signal phases are synchronized by control circuit 26 according to the outputs of frame pulse detection circuits 24 and 25. Here, a certain time (preparation time) is required before the switchover is performed in line selection circuit 21.

On the other hand, in the embodiment shown in FIG. 3, there are provided three elastic memories 270, 271 and 272, which make it possible to shorten the preparation time. As a result, a line configuration with higher quality can be obtained even when a plurality of lines each having lower quality are used.

In addition, preparation time can be reduced more if more than three elastic memories are implemented, while the amount of hardware becomes larger than the embodiments shown above.

Now, the above embodiments may also be applied when ATM (asynchronous transfer mode) technology (ITU-T I.361) is used. In an ATM network, a cell generation circuit (CELLGEN) is substituted for frame insertion circuit 11 on the transmitting side. Also, on the receiving side, cell synchronization circuits (CELLSYNC) are substituted for frame detection circuits 24 and 25.

Namely, on the transmitting side, a cell is generated from input signals by a cell generation circuit (CELLGEN) and then is branched into a plurality of lines in distribution circuit 12 to forward.

On the receiving side, for signals input from lines, the normality of cells is examined on cell basis using an alarm or error detection function in alarm detection circuits (ALMDET) provided line by line. Then cell synchronization for signals from respective lines is carried out by cell synchronization circuit (CELLSYNC) to synchronize signal phases, and to produce delays by delay circuits (DLY).

Accordingly, when an alarm or error condition is detected, an error cell is controlled at the unit of a cell so as not to be input into line selection circuit 21. Thus a line switchover can be carried out without producing momentary interruption, thereby any break or error is eliminated in output signals.

As previously explained in regard to FIG. 1, it may also be possible in the embodiment shown in FIG. 3 to apply another method for selecting a line in line selection circuits 210, 211 and 212, instead of the method of selecting a line of the best quality among input lines.

Namely, among n lines (n=4 in the example of FIG. 3) which are respectively input to line selection circuits 210, 211 and 212, the first line is selected when neither alarm nor error condition is detected in this first line. On the other hand, when either alarm or error is detected on the first line, the second line is selected when in the second line neither alarm nor error is detected. In this way, a normal line having neither alarm nor error is successively searched.

Otherwise, it may also be possible to use a method shown below: In line selection circuits 210 and 211, a memory function is provided corresponding to each line for storing a history record of the occurrences of an alarm or error condition. Respective line selection circuits 210 and 211 select a line having the least number of alarms or errors stored in the history record. When this selected line having the least alarms or errors can not be selected because of the existence of an alarm or error, a line having the second least alarms is selected.

To summarize the present invention, of which embodiments having been explained referring to the accompanied charts and drawings, on the transmitting side a pulse for the phase synchronization is inserted at the top of a frame and signals are branched to a plurality of lines; and on the receiving side, when an alarm or error is detected in received signals, frame phases are synchronized to perform a line switchover at the unit of a frame.

Accordingly, it becomes possible using a minimal configuration to select signals from a plurality of lines at the unit of a frame by switching inputs of elastic memories, and with the provision of fixed delay circuits, a high quality line transmission having no momentary interruption is realized.

What is claimed is:

1. A transmission system having an uninterruptible switchover function and comprising:

a transmitting side including:
   a frame pulse insertion circuit inserting a frame pulse for phase synchronization at the top of each frame signal, and
   a distribution circuit branching said frame signal having the frame pulse to transmit to a plurality of lines; and a receiving side including:
   detection circuits provided correspondingly to the plurality of lines, each detecting alarm and error of the frame pulse transmitted through corresponding one of the plurality of lines,
   first and second line selection circuits, each receiving the frame signals transmitted from the plurality of lines and selecting one of the plurality of lines to output the frame signal transmitted from the selected line,
   first and second delay circuits each receiving outputs from the first and second line selection circuits,
   first and second fixed-amount delay circuits respectively receiving the frame signals delayed by said first and second delay circuits and giving an identical amount of delay to the frame signals, a third line selection circuit receiving outputs from said first and second fixed-amount delay circuits and selecting and outputting either one of the outputs, which is transmitted from a normally operational line, and a control circuit adjusting the amount of delay produced by said first and second delay circuits so that phases of the outputs from said first and second fixed-amount delay circuits mutually coincide, and controlling said third line selection circuit to select either one of the outputs, which is transmitted from said normally operational line in the event of an alarm or error detected by the detection circuits on an active line.

2. The transmission system according to claim 1, wherein said first and second line selection circuits select a line having the best quality among the plurality of input lines to output a signal received from said selected line.

3. The transmission system according to claim 1, wherein said first and second line selection circuits successively search for selecting a line in neither alarm nor error condition among the plurality of input lines to output a signal received from said selected line.

4. The transmission system according to claim 1, wherein each of said first and second line selection circuits stores a history record of occurrences of alarms or errors related to the plurality of input lines, to select lines having the least number of alarms or errors to output a signal received from said selected line.

5. A transmission system having an uninterruptible switchover function and comprising:

a transmitting side including:
  a frame pulse insertion circuit inserting a frame pulse for phase synchronization at the top of each frame signal, and
  a distribution circuit branching said frame signal having the frame pulse to transmit to a plurality of lines; and a receiving side including:
  detection circuits provided correspondingly to the plurality of lines, each detecting alarm and error of the frame pulse transmitted through corresponding one of the plurality of lines,
  first, second and third line selection circuits each receiving the frame signals transmitted from said plurality of lines and selecting one of the plurality of lines to output the frame signal transmitted from the selected line,
  first, second and third elastic memories which respectively receive outputs from said first, second and third line selection circuits,
  first, second and third fixed-amount delay circuits respectively receiving the frame signals delayed by said first, second and third elastic memories and giving an identical amount of delay to the frame signals,
  a fourth line selection circuit receiving outputs of the first, second and third fixed-amount delay circuits and selecting and outputting either one of the outputs, which is transmitted from a normally operational line, and
  a control circuit adjusting the amount of delay produced by said first, second and third elastic memories so that phases of the outputs from said first, second and third fixed-amount delay circuits mutually coincide, and controlling said fourth line selection circuit to select either one of the outputs which is transmitted from said normally operational line in the event of an alarm or error detected on an active line.

6. The transmission system according to claim 5, wherein said first, second and third line selection circuits select lines having the best or better quality among the plurality of input lines to output signals received from each of said selected lines.

7. The transmission system according to claim 5, wherein said first, second and third line selection circuits successively search for selecting lines in neither alarm nor error condition among the plurality of input lines to output a signal received from each of said selected lines.

8. The transmission system according to claim 5, wherein each of said first, second and third line selection circuits stores a history record of alarms or errors related to the plurality of input lines to select lines having the least or less number of alarms or errors to output a signal received from each of said selected line.

* * * * *